United States Patent
Goto

[11] 3,825,341
[45] July 23, 1974

[54] DOPPLER RADAR USING LASER
[75] Inventor: Kenya Goto, Yohohama, Japan
[73] Assignee: Tokyo Shibaura Electric Co., Ltd., Kawasaki-shi, Japan
[22] Filed: June 11, 1971
[21] Appl. No.: 152,386

[52] U.S. Cl............................. 356/28, 331/94.5 A
[51] Int. Cl. ............................................ G01p 3/36
[58] Field of Search...................... 356/28; 331/94.5

[56] References Cited
UNITED STATES PATENTS
| | | | |
|---|---|---|---|
| 3,409,369 | 11/1968 | Bickel................................... | 356/28 |
| 3,412,251 | 11/1968 | Hargrove ............................ | 250/199 |
| 3,431,514 | 3/1969 | Oshman et al...................... | 250/199 |

*Primary Examiner*—Maynard R. Wilbur
*Assistant Examiner*—S. C. Buczinski
*Attorney, Agent, or Firm*—Flynn & Frishauf

[57] ABSTRACT

A Doppler radar comprising a mode-locked laser oscillating in a single longitudinal mode which generates a laser beam including a plurality of electromagnetic waves of an equal frequency interval; a light transmitting telescope for directing said laser beam to a moving object; a light receiving telescope for receiving from the moving object a plurality of reflected waves subjected to Doppler shift; a photofilter for eliminating background noises from output beam of the light receiving telescope; a photodiode for mixing said plurality of waves and drawing out from the waves only the signal which has a frequency corresponding to the aforementioned equal frequency interval; a photomultiplier for mixing a plurality of reflected waves after their passage through the photofilter and drawing out from the reflected waves only the signal which has a frequency interval corresponding to the equal frequency interval of the transmitted waves; a circuit for mixing outputs from the photodiode and photomultiplier and a frequency counter for counting the frequency of the output signal from the mixing circuit to detect the relative speed of the moving object to that of the observing body.

9 Claims, 10 Drawing Figures

DOPPLER RADAR USING LASER

This invention relates to a Doppler radar for detecting the relative speed of a moving object to an observing apparatus using coherent electromagnetic waves, for example, visible laser beams or infrared laser beams.

The prior art Doppler radar includes an electromagnetic wave generator for generating electromagnetic waves of a single frequency. The speed of a moving object is detected by the beat frequency representing a difference between the frequency of the generated electromagnetic waves and that of the reflected waves returning from the moving object. The generator necessitates a frequency stabilizer to prevent the frequency of generated electromagnetic waves from varying with time. The conventional equipment has the drawbacks that the variation in the oscillation frequency of the electromagnetic waves issued in the generator and the variation in the frequency caused by the possible wavering of a medium prevailing between a moving object and an observing apparatus leads to detrimental errors in Doppler frequencies determined by observation.

Hereinafter are concretely detailed the aforesaid shortcomings. An ordinary generator which is not provided with a special automatic frequency control device unavoidably allows the generated frequency to vary to a degree of $10^{-6}$ to $10^{-4}$ Hz. Assuming that generated waves have a frequency of $10^{14}$ Hz, the resulting frequency variation will be of the order of GHz. Even an automatic frequency control device having the highest precision available at present only restricts frequency variation to an extent of $10^{-10}$ to $10^{-9}$ with the inevitable occurrence of frequency variation ranging from 10 to 100 KHz. Moreover, an automatic frequency control device even of such precision becomes bulky. Referring to the precision of a Doppler radar using a generator subjected to the aforementioned frequency variation, with the frequency of generated electromagnetic waves represented by $\nu_0$, the frequency of reflected waves by $\nu$, the relative speed of a moving object to an observing apparatus by V and shifts in the Doppler frequency by $f$, then the Doppler frequency shift $f$ may, as is well known, be expressed by the following equation:

$$f = \nu_0 - \nu = 2\nu_0 V/c \cos\theta \qquad (1)$$

where:

$\theta$ = angle defined by the travelling direction of an object with the direction of generated electromagnetic waves.

Where there is determined the Doppler frequency shift from Equation (1) above, with $\theta$ set at zero, $\nu_0$ at $3 \times 10^{14}$ Hz, V at 36 km/h = 10 m/sec and $c$ at $3 \times 10^8$ m/sec, then $f$ will amount to 10 MHz. Accordingly, even if there is used an expensive frequency control device, the frequency of generated electromagnetic waves will unavoidably shift to the aforesaid extent of 10 to 100 KHz. This means that said control device only allows frequency variation of the dynamic range to be determined with a precision of the order of one or two places at most.

Next is described frequency variation resulting from the wavering of a medium prevailing between a moving object and an observing apparatus. H. Hodara et al report in the Proceedings of IEEE, Vol. 54, No. 3, March, 1966, P. 368, under the title of "Laser Wave Propagation through the Atmosphere", that with the relative distance Lc of the atmosphere set at about 10 m and the relative time Tc thereof at $10^{-3}$ sec, the length $\lambda_0$ of coherent electromagnetic waves at $10^{-6}$ m, the space distance L between a moving object and the observing apparatus at 5 km and the root mean square of variations in the refractive index of the atmosphere at $\sqrt{\overline{\Delta n^2}}$, where $\Delta n$ is the variation in said refractive index per 1°K of the temperature T of 300° K will broadly amount to $10^{-6}$, if said refractive index is taken to be 1.0003. Accordingly, with $\overline{\Delta n^2}$ represented by $10^{-6}$, the average square $<fr^2>$ of variations in the frequency of transmitted electromagnetic waves caused by the wavering of air due to its changing temperature may be given as $$<fr^2> = LLc/\lambda_0^2 \cdot \overline{\Delta n^2}/Tc^2$$

Substituting the aforesaid values in the equation above, average variations in the frequency of electromagnetic waves travelling both ways through the space distance of 5 km will approximate 300 KHz. If there are taken into account other factors such as the effect of wind and locally prominent wavering of air, then there will arise frequency variations of the order of MHz. Frequency variations resulting from the aforesaid changing conditions of a medium cause frequency shift $f$ to present errors.

It is, accordingly, the object of this invention to provide a laser Doppler radar which, even when there occur variations in the frequency of generated electromagnetic waves as well as in the frequency of reflected waves due to the effect of the conditions of a medium, prevents shifts between the frequency of generated transmission electromagnetic waves and that of reflected waves from presenting errors, enabling the relative speed of a moving object to an observing apparatus to be accurately defined and is also capable of producing large outputs.

SUMMARY OF THE INVENTION

According to an aspect of this invention, there is provided a laser Doppler radar which comprises a means for generating a plurality of coherent electromagnetic waves of a single longitudinal cavity mode and having an exactly equal frequency interval; means for directing the electromagnetic waves to a moving object; means for receiving from the moving object a plurality of reflected waves subjected to Doppler shift; first means for mixing said plurality of electromagnetic waves and drawing out only those waves which have a frequency corresponding to the aforementioned equal frequency interval; second means for mixing said plurality of reflected waves and drawing out only those waves which have a frequency interval corresponding to the equal interval of the transmitted electromagnetic waves; third means for mixing output signals from the first and second mixing and drawing means; and a frequency counter for detecting the speed of the moving object by counting the frequency of output signals from the third mixing means.

This invention can be more fully understood from the following detailed description when taken in connection with the accompanying drawings, in which:

Figures 1, 2:
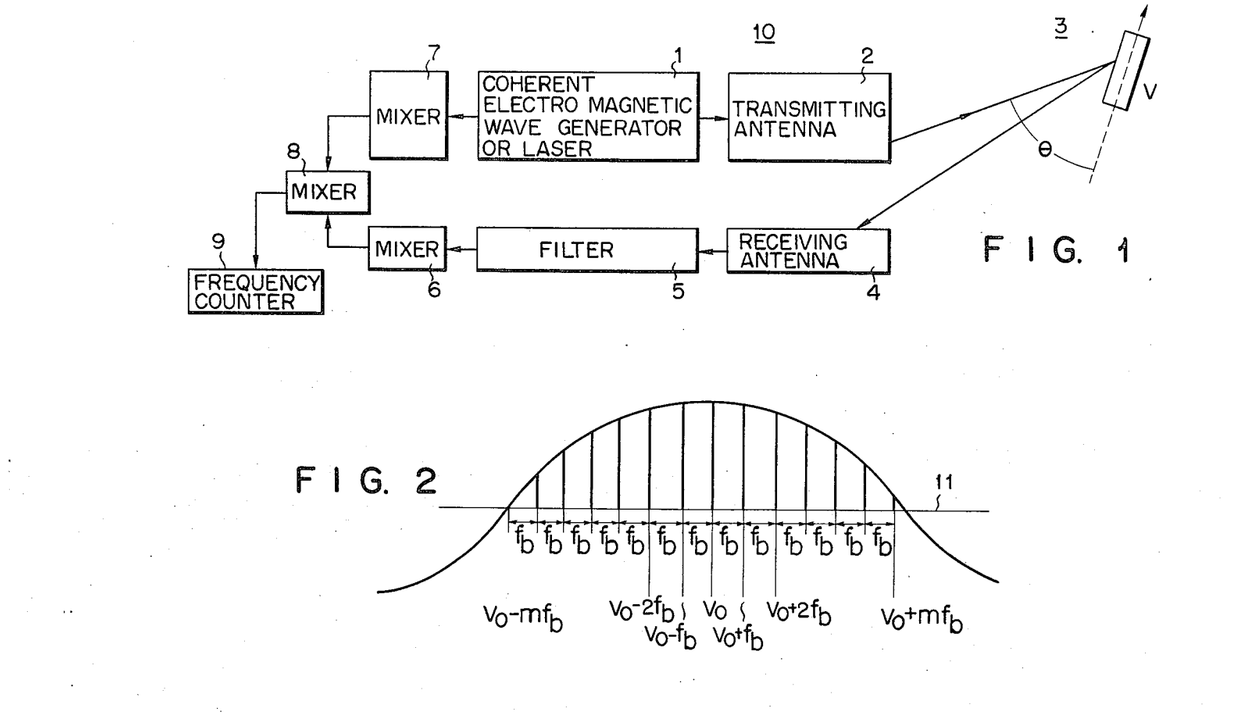
FIG. 1 presents the basic arrangement of a Doppler radar according to this invention.
FIGS. 2 and 3 are curve diagrams showing the electromagnetic wave oscillating property of said Doppler radar by way of illustrating its basic arrangement.
Figure 3:
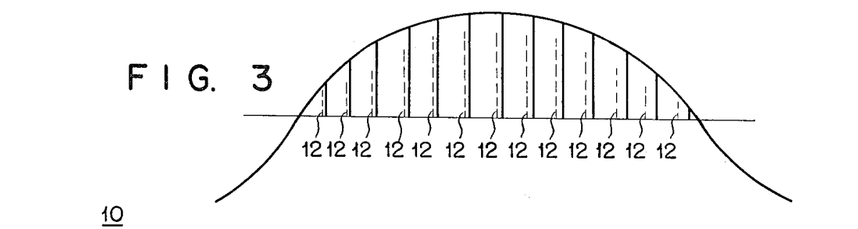

The following describes the technical concept of this invention by reference to FIGS. 1 to 3. There is provided a laser generator 1 for generating coherent electromagnetic waves with a single longitudinal mode or $TEM_{00n}$ mode. The fact that a plurality of coherent electromagnetic waves having different frequencies are included in a laser beam generated by a laser generator of a single longitudinal mode is shown in "B. Single-Mode Oscillator", Journal of Applied Physics, Volume 35, No. 10, October 1964, P 2874. The frequencies of the generated waves are shown as $Wn \neq m\pi c/L$ or $Wn = m\pi c/L$. Output from the generator 1 is directed to a moving object 3 through a transmitting antenna system 2. Reflected waves returning from the moving body 3 are received by a receiving antenna system 4. To the output terminal of the receiving antenna system 4 is connected a first mixer 6 through a filter 5 for eliminating background noises. The output terminal of the mixer 6 is connected to a third mixer 8 so as to cause signals from said mixer 6 to be mixed in said third mixer 8 with signals from a second mixer 7 to which the generating waves from the laser 1 are supplied. To the output terminal of the third mixer 8 is connected a frequency counter 9 to constitute a laser Doppler radar.

A coherent electromagnetic wave generator or laser 1 of the Doppler radar of this invention generates electromagnetic waves of different frequencies consists of, for example, a single longitudinal mode ruby laser, for generating visible coherent electromagnetic waves, which is mode locked to the single longitudinal mode or $TEM_{00n}$ mode. There can be used any type of laser generator, provided it is so designed as to generate only the $TEM_{00n}$ single longitudinal cavity-mode without issuing transverse modes. It does not matter whether said generator produces ultraviolet, extreme infrared, submilli, milli or microwaves. At this point, there is taken as an example, for convenience a ruby laser for generating waves with the $TEM_{00n}$ mode. With a solid laser, a fluorescent light assisting the generation of laser beams has a broad light-width of several hundred GHz. In the case of the ruby laser, said fluorescent light has a width of about 300 GHz. If there are generated waves only with the $TEM_{00n}$ mode by a laser resonator of length L having a fluorescent light - width W, then there are obtained a $2m + 1$ number of waves having a frequency interval of $f_b = c/2nL$ (where c denotes light speed ($3 \times 10^{10}$ m/sec), and n the refractive index of the ruby ($= 1.7$). Where a natural number $m$ is expressed by the equation $m = nLW/c$ and L is taken to be about 60 mm, then the frequency difference, namely $f_b$, between the frequencies of generated waves of ruby laser beams will amount to about 1,500 MHz. When the width of 300 GHz is divided by the interval $f_b$ of 1,500 MHz there are obtained about 200 electromagnetic waves whose frequencies are displaced about 1,500 MHz from each other, as illustrated in FIG. 2. In this FIG. 2, an envelope covering the generated waves denotes the width of a fluorescent light used for generation of waves and lateral line 11 connecting the individual waves shows the threshold value (half-width) thereof. Namely, the region above said lateral line 11 represents the actual gain of laser beams while the region below shows loss occurring in a laser resonator. With the frequency of an electromagnetic wave generated near the center of the laser resonator represented by $\nu_0$ and the longitudinal mode thereof by $TEM_{001}$, then there are generated, as indicated, waves having frequencies of $\nu_0 \pm f_b, \nu_0 \pm 2f_b \ldots \nu_0 \pm mf_b$ with modes $TEM_{00(1 \pm 1)}, TEM_{00(1 \pm 2)} \ldots TEM_{00(1 \pm m)}$.

It is known that where there occurs in a laser generator static loss or dynamic loss varying with time, then there appears a phenomenon of a self mode lock or dynamic mode lock. At this time the aforementioned modes $TEM_{001}, TEM_{00(1 \pm 1)}, TEM_{00(1 \pm 2)} \ldots TEM_{00(1 \pm m)}$ are locked with each other. As a result, the differences or intervals $f_b$ between two adjacent frequencies are all made to have the same phase. That is, all intervals $f_b$ expressed as $$f_b = [\nu_0 \pm (n+1)f_b] - [\nu_0 \pm nf_b]$$

have the same phase, this being known as a phase-lock phenomenon. For the mode-lock phenomenon, refer to "Mode Locking of Lasers" by Perter. W. Smith set forth in the Proceedings of the IEEE, Vol. 58, No. 9, PP. 1,312 to 1,357, Sept., 1970.

The Doppler radar of this invention uses electromagnetic waves generated with the $TEM_{00n}$ mode and all the aforesaid frequencies which may be collectively expressed as $$\sum_{n=-m}^{m} An \cos 2\pi(\nu_0 + nf_b)t$$

where An represents the amplitude of the electromagnetic wave of the n order.

These electromagnetic waves are transmitted through the transmitting antenna system 2 to an object 3 moving at a relative speed of $V\cos\theta$ with respect to an observing apparatus 10, and the reflected waves subjected to the Doppler shift are observed by said apparatus 10. Said reflected waves present, due to the Doppler shift, the varied frequencies which may be collectively expressed as $$\nu = \sum_{n=-m}^{m} \eta An \cos \left\{ 2\pi(\nu_0 + nf_b) \left(1 - \frac{2V}{c} \cos \theta\right) t \right\} \quad (2)$$

The resulting pattern of the Doppler-shifted reflected waves is presented in FIG. 3, the solid lines denoting the frequencies of the transmitted waves and the dotted lines 12 denoting the frequencies of said reflected waves. The reflected waves are received by the receiving antenna system 4 and then conducted through the filter 5 to a square detector or the first mixer 6. Said detector 6 generates due to its property of conducting square multiplication electromagnetic waves proportionate to $$\sum_{i=-m}^{m} \sum_{k=-m}^{m} \eta^2 \left[ A_i \cos \left\{ 2\pi(\nu_0 + if_b) \left(1 - \frac{2V}{c} \cos \theta\right) t \right\} + A_k \cos \left\{ 2\pi(\nu_0 + kf_b) \left(1 - \frac{2V}{c} \cos \theta\right) t \right\} \right]^2 \quad (3)$$

From Equation (3), above, is developed $$\sum_{i=-m}^{m} \eta^2 A_i^2 \cos\left\{2\pi(\nu_0 + if_b)\left(1 - \frac{2V}{c}\cos\theta\right)t\right\}^2$$

$$+ \sum_{k=-m}^{m} \eta^2 A_k^2 \cos\left\{2\pi(\nu_0 + kf_b)\left(1 - \frac{2V}{c}\cos\theta\right)t\right\}^2$$

$$+ \sum_{i=-m}^{m}\sum_{k=-m}^{m} \eta^2 A_i A_k \cos\left\{2\pi\left(1 - \frac{2V}{c}\cos\theta\right)t(2\nu_0 + (i+k)f_b)\right\}$$

$$+ \sum_{i=-m}^{m}\sum_{k=-m}^{m} \eta^2 A_i A_k \cos\left\{2\pi\left(1 - \frac{2V}{c}\cos\theta\right)t(i-k)f_b\right\} \quad (4)$$

The electromagnetic waves represented by the first, second and third terms of Equation (4) above include the basic high frequency $\nu_0$ of the transmission electromagnetic waves, but those represented by the fourth term do not contain said high frequency $\nu_0$. Namely, if the aforesaid square detector or first mixer 6 is so set as to respond at a speed of less than $1/2mf_b$ second, said means only produces a component of Doppler shifted electromagnetic waves corresponding to the fourth term, which may be expressed as $$\sum_{i=-m}^{m}\sum_{k=-m}^{m} \rho\eta^2 A_i A_k \cos\left\{2\pi t f_b\left(1 - \frac{2V}{c}\cos\theta\right)(i-k)\right\} \quad (5)$$

where:
$\rho$ = conversion efficiency of the detector or mixer

The followings are concrete examples. Where $\nu_0$ represented infrared laser signals whose wave length approached 1 $\mu$, a photomultiplier having a photoelectric sensitivity curve S-1 failed, when used as a detector 6, to produce outputs corresponding to the terms other than the fourth term. The curie S-1 represents the spectral response of Sb-Ce photo-emissive surface. In contrast, where the aforesaid square detector or first mixer 6 consisted of dielectric crystals such as $LiNbO_2$ or KDP, there was detected a component of electromagnetic waves represented by the third term whose wave length approached 5,000 A, that is, the region of light wave length. In other words, the selective detection of electromagnetic wave components corresponding to each term of Equation (4) is made possible depending on the frequency responding speed of the square detector or first mixer 6.

The following describes the method of determining from Equation (5) above the relative speed Vcos 74 of moving object 3 to the observing apparatus 10, the object for which the Doppler radar is primarily intended.

With the average values of $A_i$ and $A_k$ represented by A, Equation (5) above may be approximately expressed as $$\sum_{i=-m}^{m}\sum_{k=-m}^{m} \rho\eta^2 A^2 \cos\left\{2\pi f_b t\left(1 - \frac{2V}{c}\cos\theta\right)(i-k)\right\} \quad (6)$$

Equation (6) above may be developed into $2m(2m+1)$ terms. Those of said terms which satisfy the relationship of $(i-k)=1$ are present in a number of $2m$. This relationship denotes the mutual interference of the adjacent reflected waves indicated in dotted lines in FIG. 3. If the square detector or first mixer 6 is made to respond to frequency bands around $f_b$ or there is disposed before said means the filter 5 which only allows the passage of electromagnetic waves having frequency bands around $f_b$, then the electromagnetic waves derived from Equation (6) above will only have a frequency expressed as $$2m\rho\eta^2 A^2 \cos 2\pi f_b(1-2V/c \cos\theta)t \quad (7)$$

when said electromagnetic waves are mixed in the third mixer 8 with separately preset electromagnetic waves or output having a frequency of $$B\cos(2\pi f_b t+\theta) \quad (8)$$

which has been supplied by the laser 1 through the second mixer 7, then there are obtained signals which may be expressed as $$2m\rho\gamma\eta^2 A^2 B\cos(2\pi f_b t(2V/c)\cos\theta+\phi) \quad (9)$$

where:
$\gamma$ = the efficiency of the third mixer 8

In this equation 9, the term "$2m\rho\gamma\eta^2 A^2 B$" denotes an amplitude of the output signal of mixer 8 and the term "$2\pi f_b t(2V/c)\cos\theta$" includes the frequency information of the Doppler effect for determining the relative speed of the moving object 3 to the observing apparatus 10. The frequency component of the latter term is obtained by dividing it by the term "$2\pi t$".

When said signals of equation 9 are supplied to the frequency counter 9 and the frequency $2Vf_b\cos\theta/c$ of the electromagnetic waves represented by Formula (9) above is determined, then there is obtained the relative speed of the moving object 3 to the observing apparatus 10.

The aforementioned laser Doppler radar of this invention has the following advantages over the prior art device.

1. Fluctuation in the frequency of generated laser waves can be completely ignored, making it unncessary to provide a laser frequency stabilizer. Variations in the frequency of waves generated by the conventional laser generator generally indicate several to scores of MHz in the visible range of frequency. With the Doppler radar system of this invention, however, the most important factor is not the absolute stability of light frequency, but the stability of the frequency of adjacent light wave groups of a plurality of groups of light waves counted as $2m+1$. Therefore, even if there occur fluctuations in the frequencies $\nu_0-mf_b$, $\nu_0-(m-1)f_b$, ... $\nu_0$, $\nu_0+f_b$, ... $\nu_0+mf_b$ of light wave groups shown in FIG. 2, it will not affect determination at all, provided $f_b$ maintains a fixed value.

To keep $f_b$ at a fixed level, it is only necessary to define the wave length with which the laser resonator is desired to resonate. Then frequency control can be easily effected to an extent of about $10^{-10}$/ms, thereby elevating the precision of $f_b$ to over $10^{-7}$/sec. If, therefore, there is used a generator for generating laser beams having the same frequency as $f_b$ as a local generator capable of maintaining the precision of $f_b$ at a level of more than $10^{-7}$ /sec and output from said generator with electromagnetic waves represented by Formula (7), then there will be obtained electromagnetic waves indicated by Formula (9).

2. It is possible to overlook variations in the frequency of electromagnetic waves transmitted or received which result from disturbance by air or other media while they travel through the intervening space. The Doppler radar of this invention performs the same function as that of a transmission wave and a locally oscillated wave which are made to travel simultaneously through the space. Therefore, the effect of frequency variations resulting from disturbance by space media can be offset.

3. There is no need to provide a single frequency wave generator.

The prior art laser Doppler radar requires an extra device to convert the electromagnetic waves generated by a laser generator to a single frequency signal. Further conversion to such single frequency signal resulted in decreased output, limiting the extent of detection by the radar. In contrast, this invention eliminates the necessity of using single frequency signal, permitting observation over a long distance due to its large output.

4. Signal-noise ratio can be increased. Unlike the conventional single frequency Doppler radar, this invention is operated by a plurality of simultaneously generated frequencies allowing a large signal-noise ratio to be used.

5. Pulses can be used.

Where transmission laser light or coherent electromagnetic waves are of single pulses, there is generally required locally oscillated laser light having substantially the same frequency as that of transmission waves or a coherent electromagnetic wave generator. Or it is necessary to separate part of the transmission laser light and delay said part by a length of time required for reflected waves to return to an observing apparatus, using an optical delay circuit, and to mix said separated portion with the arriving reflected waves. If the pulses have a narrow width, this is extremely difficult. Since, however the Doppler radar of this invention adopts a method of utilizing the adjacent frequencies of transmission laser beams instead of locally generating them, there is no need for an extra laser generator of coherent electromagnetic wave generator for local generation. It will be noted that locally generated electromagnetic waves represented by Formula (8) to be mixed in the second mixer in obtaining signals denoted by Formula (9) may be produced by either of the following two processes:

A. First process eliminating the use of an optical delay circuit or second electromagnetic wave generator for local emission:

This process consists of separating part of transmission laser light or coherent electromagnetic waves as described above and directly conducting said part to a square detector, thereby obtaining signals expressed as $$2m\sigma A^2 \cos 2\pi f_b t \tag{10}$$

(where $\sigma$ denotes efficiency and rate of wave division) in the same way as is used in deriving Formula (7).

Since the resulting waves expressed by the term (10) are no longer electromagnetic waves having as high a frequency as that of light waves, there can be easily obtained delayed signals by an ordinary delay circuit. When, therefore, the waves denoted by Formula (10) are conducted to a delay circuit to be delayed by a length of time required for reflected waves to return to an observing apparatus and mixed with the waves represented by Formula (7), then there are obtained the desired waves having a frequency indicated by Formula (9), making it possible to determine the relative speed of a moving object to an observing apparatus:

B. Second process using a second electromagnetic wave generator for local generation.

This process consists of controlling the wave length with which the resonator of the laser generator is desired to resonate. It is generally very easy to control said wave length to $10^{-7}$ /sec. Therefore, within a time interval of 100 microseconds at most between the emission and reception of transmitting laser beams, said wave length can be very easily controlled with a precision of more than $10^{-10}$ /msec. If, therefore, the second electromagnetic wave generator for local generation consists of a type capable of controlling with a precision of more than $10^{-10}$ /msec, then the Doppler radar can be operated in generating pulses without using a delay circuit.

6. Frequencies of laser beams containing information can be converted to proper frequencies such as $f_b$, $2f_b$, $3f_b$ . . .

The foregoing description relates, for sake of briefness, to the case of $(i-k)=1$, namely, where there was only discussed a conversion frequency $f_b$ in deriving Formula (7) from Formula (6) by pertinent selection of the response speed of the mixers and the type of filter. However, the aforesaid frequencies of laser beams containing information can be converted to convenient frequencies for a local generator or treatment of information, that is, to choose the value of $(-k)$ to be 2, 3 or 4.

7. The prior art Doppler radar using visible laser beams has to handle elevated frequencies, requiring advanced instrucments and techniques in processing information. However, the Doppler radar system of this invention reduces the frequencies of laser beams containing information to lower levels in advance, thus permitting easy treatment of information.

The foregoing description relates to the case where this invention was used with a ruby laser, but it will be apparent that the invention is applicable to solid lasers such as YAG laser, glass laser and $CaWO_4$ laser, gas laser such a He-Ne type, an ion laser, $CO_2$ laser, infrared laser and semiconductor laser, as well as to a far infrared laser, submillimeter wave laser, and equipment using other frequency regions of electromagnetic waves, such as millimeter waves, microwaves, ultraviolet rays and X-rays.

This invention will be understood more fully by reference to the embodiments which follow.

EMBODIMENT 1

Figure 4:
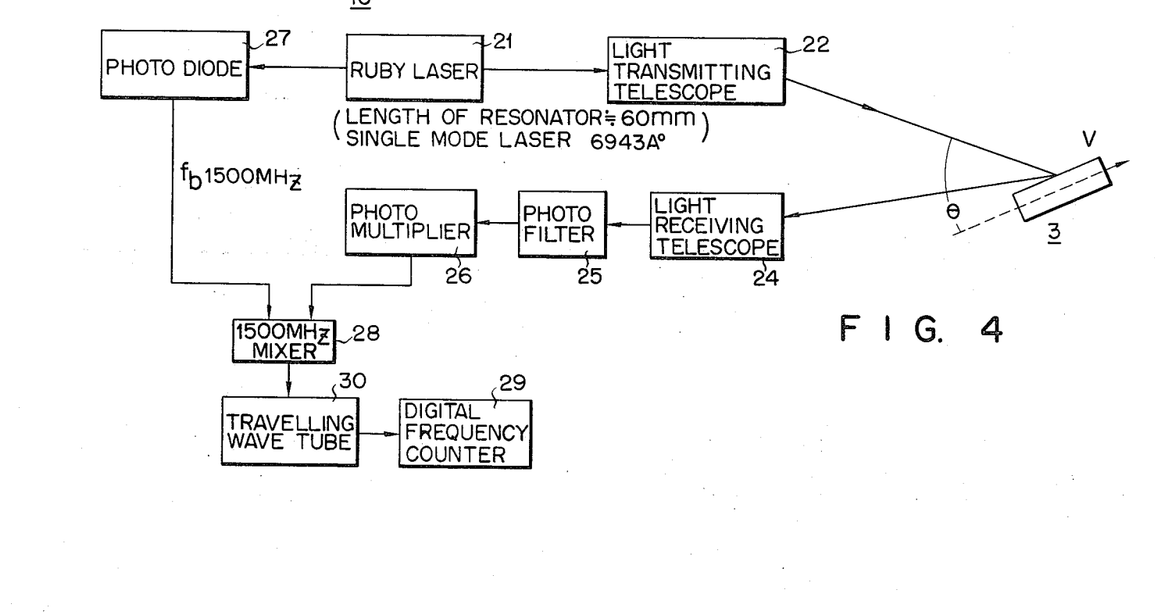
FIG. 4 is a block circuit diagram of an embodiment of the invention.

FIG. 4 relates to the case when this invention is used with a ruby laser including a resonator 60 mm long. In the case of a 60 mm long resonator, a 6,943 A laser 21, operating with a single longitudinal mode, mode OOn), generates more than one hundred laser each having a frequency interval of about 1,500 MHz. Provided the resonator has a prescribed length and the frequency interval $f_b$ between the respective laser beams is fixed, occurrence of frequency variations in the laser beams as a whole would not raise any problem. Portions of these laser beams are mixed in a photodiode 27, such as a PIN silicon diode and silicon avalanche photodiode to determine the beat frequency $f_b$ ($\approx$ 1,500 MHz). On the other hand, there are projected laser beams through a transmission telescope 22 to an object 3 flying at a speed V in a direction which defines, as viewed from the observing apparatus, an angle $\theta$ with the direction of transmitting laser beams. Reflected beams from said flying object 3 are received by a light-receiving optical system consisting of a light-receiving telescope 24 and an optical filter 25 allowing the passage of only light beams having a wave length of 6,943 A. The reflected waves thus received are guided into a crossfield electrostatic type photomultiplier 26. The reflected waves are mixed in said photomultiplier 26, which has a property of square-law detection. Since the reflected waves have already been subjected to the Doppler shift, the beat between them is different from the aforesaid $f_b$ ($\approx$ 1,500 MHz) and contains the Doppler-shifted portion represented by Formula (7). When there are mixed in a 1,500 MHz mixer 28 part of the original laser beams having a frequency interval $f_b$ which was introduced through the photodiode 27 from the ruby laser 21 and laser beams representing the beat between the reflected beams, there are obtained electromagnetic waves having a frequency of $[2V\cos\theta/c \times 1,500]$ MHz. Said electromagnetic waves are read out by a digital frequency counter 29, if necessary, after being properly amplified, for example, by a travelling wave tube 30. A radar constructed as described above does not present errors of determination even without using a resonator length control device, provided the resonator only slightly varies in length to an extent of less than several hundred Hz.

EMBODIMENT 2

Figure 5:
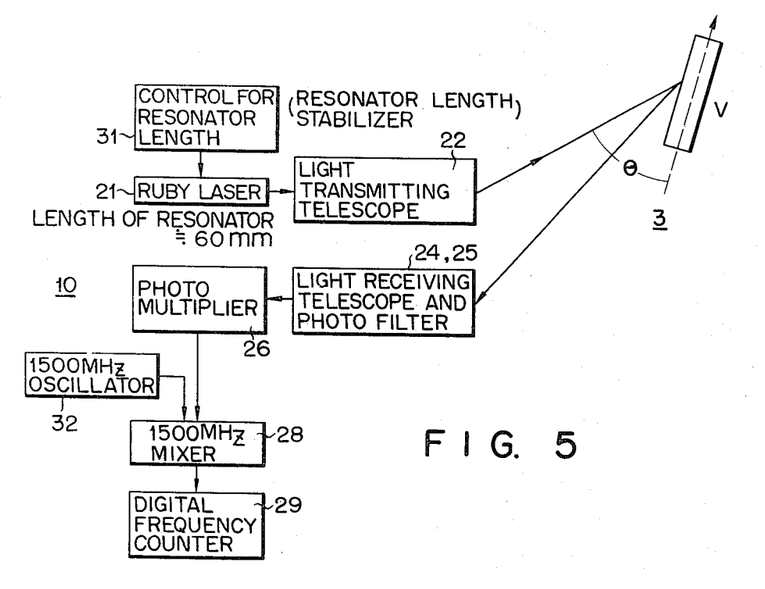
FIGS. 5 to 9 are block circuit diagrams of other embodiments of the invention.

Hereafter is described, by reference to FIG. 5, another embodiment of this invention. The same parts of FIG. 5 as those of FIG. 4 are denoted by the same numerals and description thereof is omitted. FIG. 5 represents the case where there is additionally provided a resonator length stabilizer 31 for controlling the length of a resonator used in a ruby laser with a precision of $10^{-10}$/msec using, for example, a temperature control. Since, in this case, $f_b$ is fixed, there is separately provided a 1,500 MHz local generator 32 capable of operating with a higher precision than that which is demanded of a frequency corresponding to $f_b$. The waves obtained from said local generator and output waves from the photomultiplier 27 are mixed to read out the frequency of the mixed waves.

EMBODIMENT 3

Figure 6:
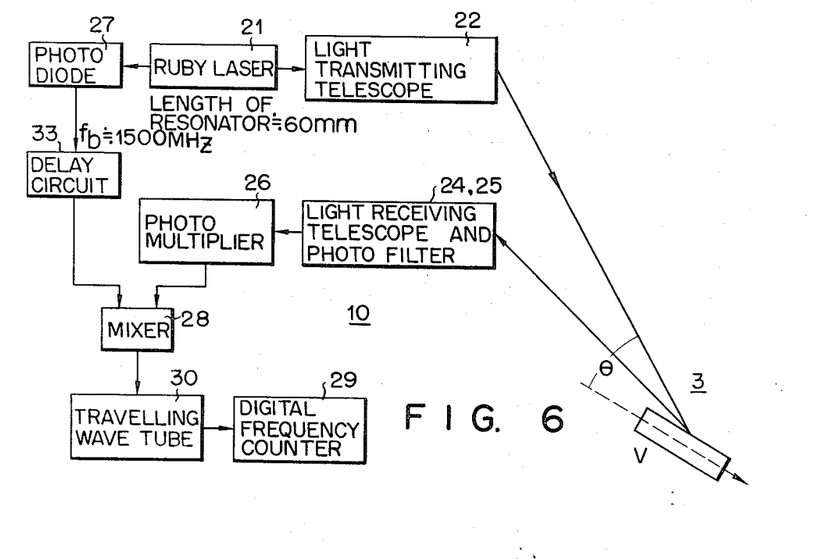

FIG. 6 shows another embodiment of this invention which fully eliminates the necessity of providing the resonator length stabilizer 31 of FIG. 5. The same parts of FIG. 6 as those of FIG. 4 are denoted by the same numerals. The embodiment of FIG. 6 consists in directing laser beams from the ruby laser 21 to a flying object 3 and delaying by a delay circuit 33 a beat wave $f_b$ formed by introducing a previously separated portion of the laser beams originally generated by the ruby laser 21 into a laser beam mixer represented by the photodiode 27, by a length of time equal to that which is required for the reflected laser beams returning from the flying object 3 to enter the photomultiplier 27 or light wave detector and the wave representing the beat between said reflected laser beams (of course subjected to the Doppler shift) containing information on the speed of the flying object 3 to be conducted into the following mixer 28. According to the embodiment of FIG. 6, only if, despite momentary variations in the length of a resonator included in the ruby laser, laser beams are momentarily generated with a single longitudinal mode, that is, the $TEM_{00n}$ mode, then the frequency indicated in the frequency counter is theoretically proportionate to the momentary $f_b$ and the momentary speed V of the flying object 3. More information on said momentary $f_b$ is sufficient to enable the Doppler radar of this invention to be used with pulse laser beams.

EMBODIMENT 4

Figure 7:
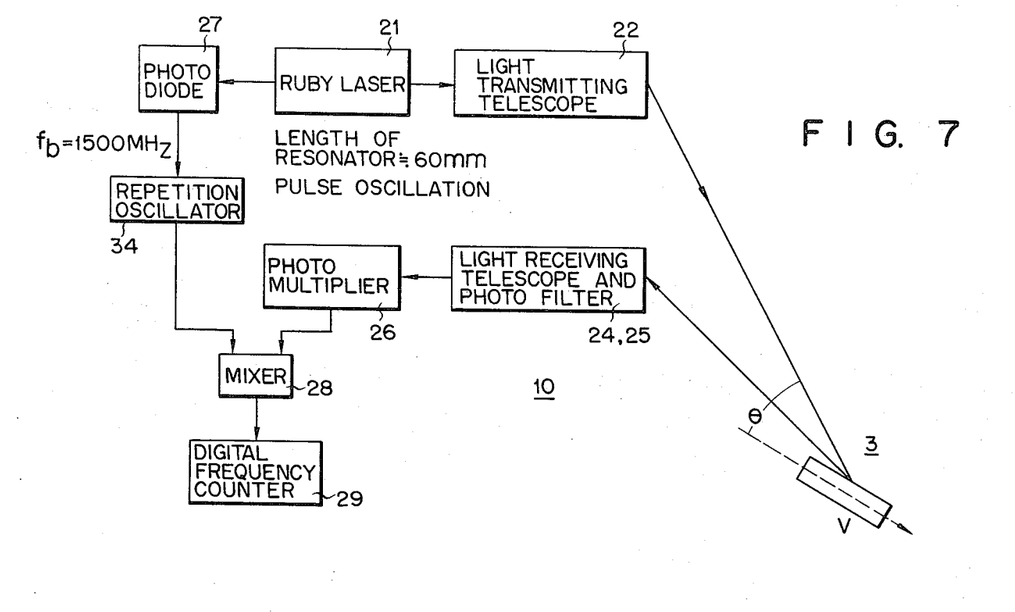

FIG. 7 illustrates still another embodiment of this invention including a single pulse laser generator, thereby making it possible to use pulse laser signals. According to the embodiment of FIG. 7, there is used in place of the delay circuit 33 of FIG. 6 a repetition generator 34 which repeatedly generates a single $f_b$ signal upon its receipt with the same frequency signal. Information on the speed of a flying object 3 is obtained by comparing the frequency of waves generated by said repetition generator 34 and that of output from the photomultiplier 27.

EMBODIMENT 5

Figure 8:
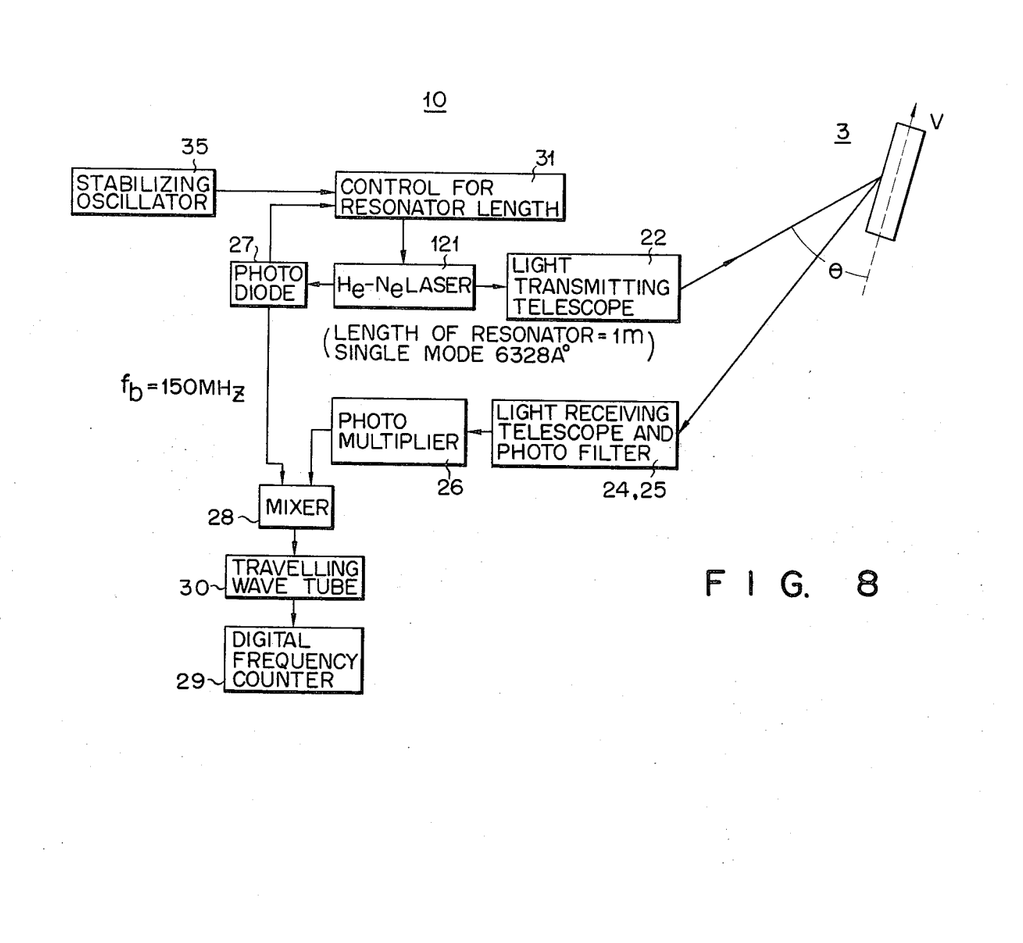

FIG. 8 indicates a further embodiment of this invention where the laser beam generator consists of a He-Ne gas laser 121 generating laser beams with a single mode of 6,328 A. In the case of a resonator 1 $m$ long, $f_b$ amounts to about 150 MHz. Since the gas laser is generally likely to cause the resonator length to vary more prominently than the solid type, $f_b$ output from the photodiode 27 is compared with the frequency of waves generated by a high frequency stabilizer 35, the resulting differential component is conducted into the resonator length stabilizer 31 to properly adjust the length of the resonator of the He-Ne gas laser 121, and the frequency interval $f_b$ between the generated laser beams is made to conform with the referential frequency of waves generated by said high frequency stabilizer 35. Such stabilization of $f_b$ permits the accurate determination of the speed of a flying object 3, no matter what variation occurs in the absolute values of the frequency of generated laser beams.

EMBODIMENT 6

Figure 9:
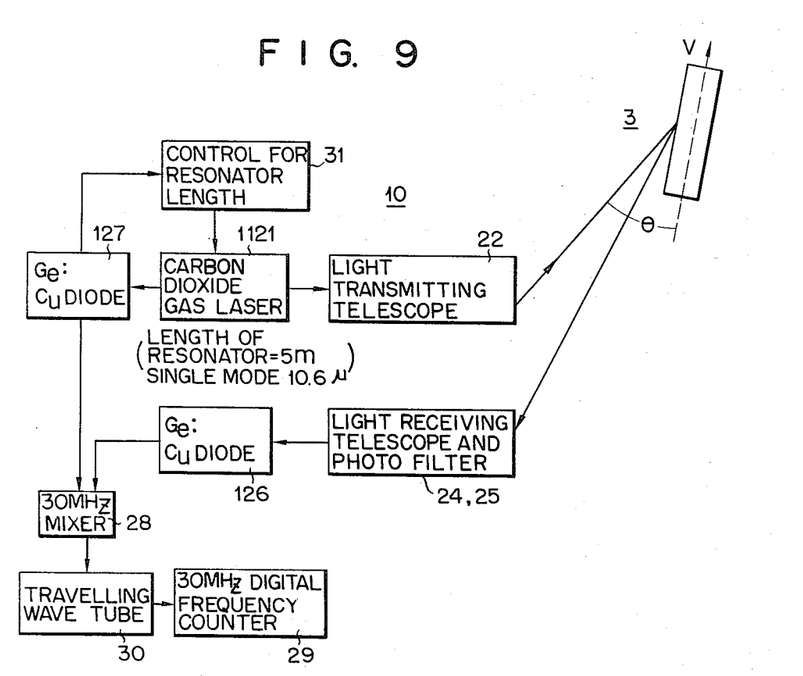
Figure 10:
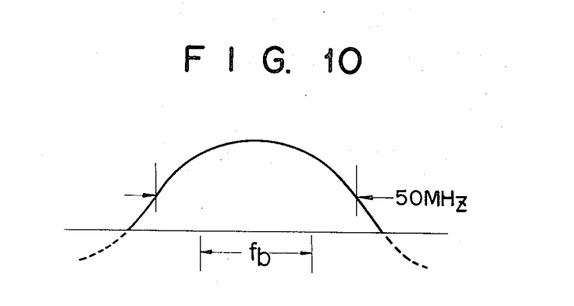
FIG. 10 is a curve diagram showing the electromagnetic wave oscillating property of the embodiment of FIG. 9.

FIG. 9 represents a further embodiment of this invention where the Doppler radar includes a carbon dioxide gas laser. Since the wave length of the carbon dioxide gas laser 1,121 is approximately 10 microns, the half width of fluorescent light (Doppler width) is very narrow, such as about 50 MHz. Accordingly, where the resonator has a length of 5 $m$, $f_b$ will amount to about 30 MHz, only allowing two laser beams to be generated. (A large gain in a laser overcomes its loss and the region of dotted lines in FIG. 10 contributes to generation of laser beams, enabling several laser beams to be observed.) However, generated laser beams are sufficiently powerful to allow a high signal-noise ratio for reflected waves. Ge:Cu diodes 126, 127 sensitive to a 10 micron frequency band can respond to 30 MHz, so that the Doppler radar of this invention may be formed, as shown in FIG. 9, by substituting said Ge:Cu diodes 126, 127 for the photomultipliers 26, 27 of FIG. 8.

As mentioned above, this invention comprises a means for transmitting to a moving object a plurality of coherent electromagnetic waves generated with a single longitudinal mode ($TEM_{00n}$ mode) and having the same frequency interval, and means for mixing reflected waves from the moving object subjected to the Doppler shift, thus providing a type of Doppler radar free from the aforementioned drawbacks.

What is claimed is:

1. A Doppler radar comprising a means for generating a plurality of coherent electromagnetic waves having a single longitudinal mode and an equal frequency interval, means connected to said generating means for directing said electromagnetic waves to a moving object, means for receiving from the moving object a plurality of reflected waves subjected to the Doppler shift, a first means for forming signals having a frequency corresponding to the aforementioned equal frequency interval, a second means connected to said receiving means for mixing a plurality of reflected waves and drawing out from the reflected waves only the signal which has a frequency corresponding to the equal frequency interval of the transmitted laser beams and subjected to Doppler shift, using beat signals between reflective waves, a third means connected to the output terminals of said first and second means for mixing outputs therefrom and obtaining beat signals between the signals formed by the first means and those drawn out by the second means, and means for detecting the speed of the moving object relative to an observing apparatus on which the radar is disposed.

2. A Doppler radar according to claim 1, wherein said coherent electromagnetic waves are mode locked and the first means comprises means for mixing a plurality of electromagnetic waves generated by the generating means.

3. A Doppler radar according to claim 2, wherein the generating means is a ruby laser and the reflected wavereceiving means includes a photofilter for eliminating background noises, the first mixing means includes a photodiode, the second mixing means includes a photomultiplier, the relative speed detector includes a travelling wave tube for amplifying output from the third mixing means and a frequency counter connected to the travelling wave tube.

4. A Doppler radar according to claim 3, wherein the transmitting and receiving means, respectively, include a light-transmitting telescope and a light-receiving telescope.

5. A Doppler radar according to claim 1, wherein there is connected between the first and third mixing means a device for delaying output from the first mixing means by a length of time required for the originally transmitted electromagnetic waves to be received in the form of reflected waves from the moving object and conducted to the third mixing means.

6. A Doppler radar according to claim 3, wherein the laser is a pulsed laser for generating pulses and there is disposed between the output terminal of the photodiode and the input terminal of the third mixing means, a repetition frequency generator which, when it is supplied from the photodiode with a signal having a frequency corresponding to the equal frequency interval, repeatedly generates output signals.

7. A Doppler radar according to claim 2, wherein the generating means is a He-Ne gas laser and includes a frequency stabilizer and resonator length-controlling means connected to the output terminal of the first mixing means to control the length of a resonator included in said laser.

8. A Doppler radar according to claim 2, wherein the generating means is a carbon dioxide gas laser including resonator length-controlling means, and the first and second mixing means include Ge-Cu diodes, with the output terminal of the first mixing means connected to the resonator length-controlling means.

9. A Doppler radar according to claim 1, wherein said coherent electromagnetic waves are mode locked, the generating means is a laser provided with a resonator length-controlling means for fixing the length of a resonator included therein, and the first means includes generating means for generating a signal having a frequency corresponding to the equal frequency interval between the generated electromagnetic waves.

* * * * *